Patented Nov. 27, 1928.

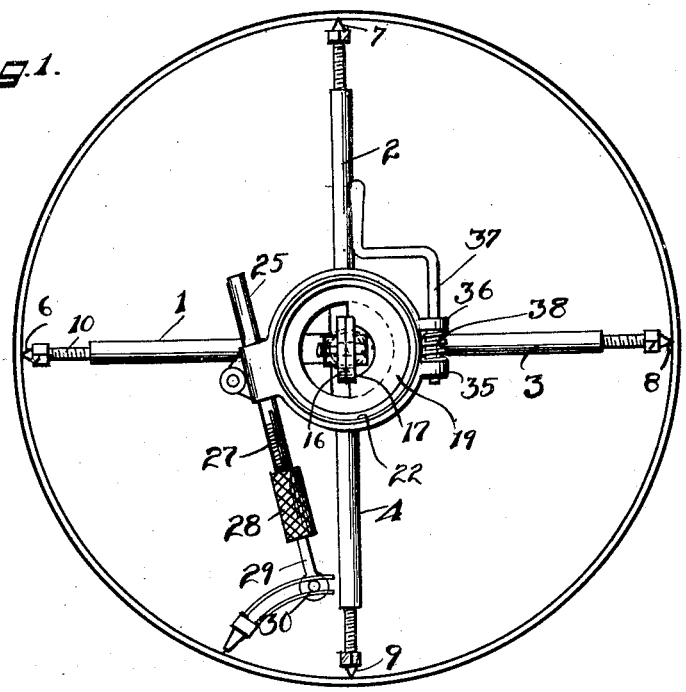
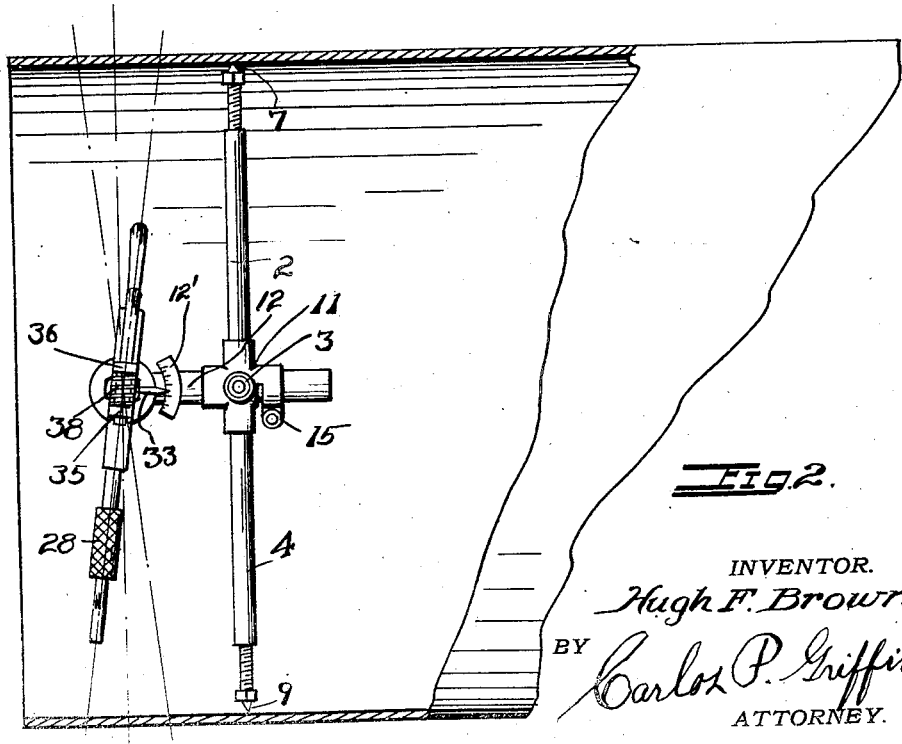

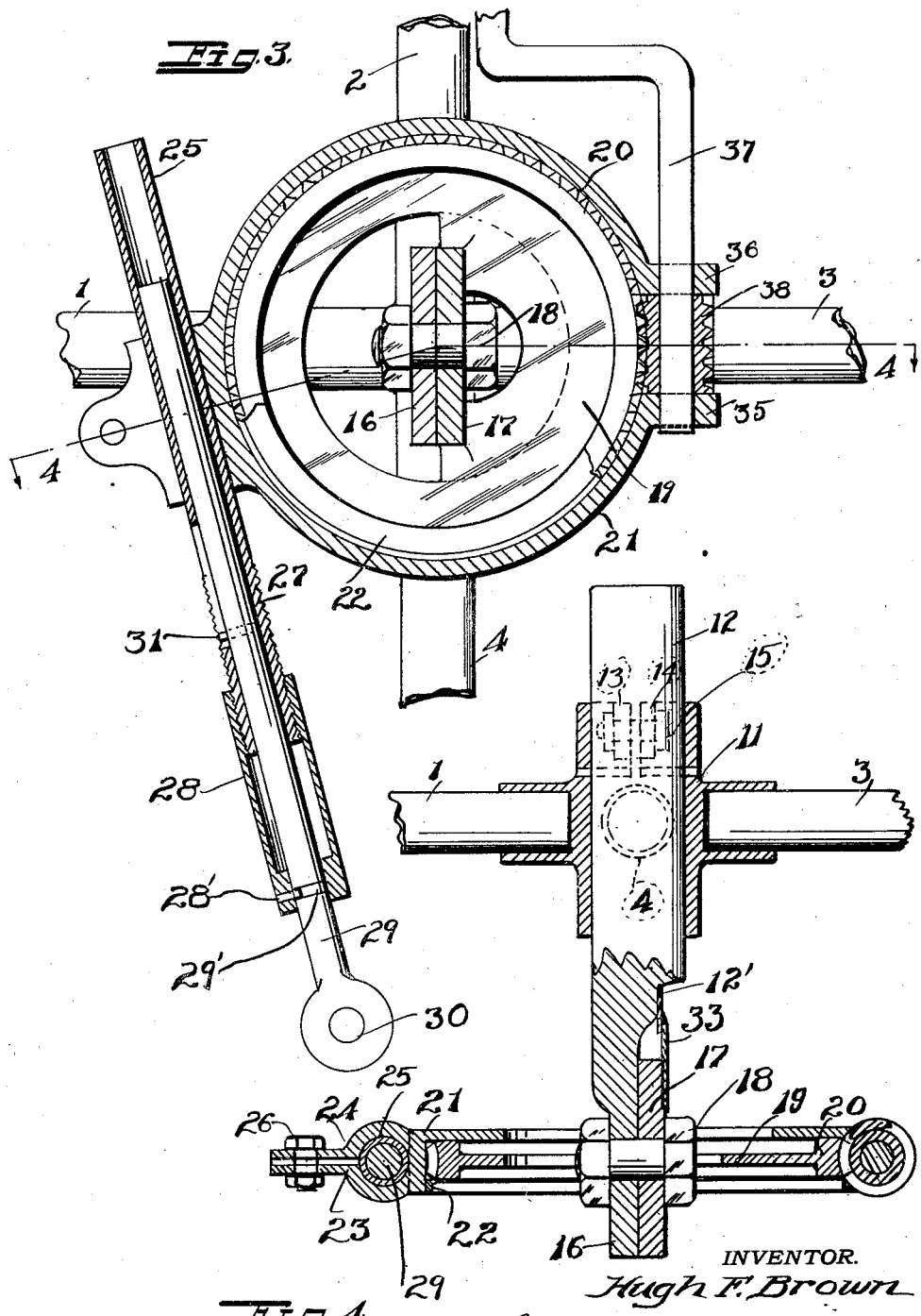

1,692,924

UNITED STATES PATENT OFFICE.

HUGH F. BROWN, OF SAN FRANCISCO, CALIFORNIA, ASSIGNOR TO BROWN BROTHERS WELDING COMPANY, A PARTNERSHIP, OF SAN FRANCISCO, CALIFORNIA.

BURNER HOLDER.

Application filed May 19, 1926. Serial No. 110,068.

This invention relates to a torch holder intended for the purpose of securing the torch in a given position in a pipe to cut off the pipe for making splices. It will be understood by those skilled in the art that in conducting pipe lines it is common to weld together the lengths of pipe and since it is impossible to also have one length of pipe in alignment with the other lengths there is a continual necessity for cutting off the pipe lengths to fit the next adjacent pipe whether the angle be caused by raising or lowering, or by a lateral movement of one pipe with respect to the other. These cuts are ordinarily made by hand and are necessarily very uneven because it requires a very expert workman to even make the cut to say nothing about making a cut on an angle, and at the same time properly beveling the cut to provide for the metal necessary for the weld.

With the present invention, the burner tip is secured in a given position on an arm, and this arm is advanced to the cutting position whereupon the burner and the arm are continuously rotated by the operation of a movable crank acting upon a fixed worm gear with the result that the pipe is cut off in a substantially perfect plane with a sufficient bevel all around.

Other objects of the invention will appear as the description proceeds.

An embodiment of the invention is shown in the accompanying drawings in which the same reference numeral applies to the same portion throughout the several figures of the drawings and of which there may be modifications.

Figure 1 shows the apparatus set up in a pipe ready for the burner to be adapted thereto, Figure 2 is a plan view of the apparatus as set up in Figure 1, a portion of the pipe being broken away to show the location with respect thereto of the burner holder, Figure 3 is an enlarged view showing the location of the gear inside the casing to which it is applied, Figure 4 is a plan view of the holder hub and worm gear partly in section.

The burner holder consists of four arms 1 to 4 inclusive, at the outer end of which each is provided with a steel spike as indicated at 6 to 9 inclusive. Each of these spikes has a rectangular head and its shank is threaded into the arms 1 to 4, as indicated at 10. These spikes are used for the purpose of centering the burner holder hub 11 inside the pipe. This hub has a tube 12 slidable therethrough for the actual support of the burner parts, and it has an extended split collar with the lugs 13 and 14 tightened on the arm 12 by means of a bolt 15. At one end the arm 12 has a flattened head 16 which is secured to a plate 17 by means of the bolt 18. The plate 17 is secured to, or formed integral with the web 19 of the worm wheel 20, the object being to hold the worm wheel in a fixed position, while the burner holder proper revolves around the fixed worm wheel.

Surrounding the worm wheel is a flanged ring 21 which has a detachable ring 22 bolted thereto to hold the flanged ring in place on the worm gear. The flange ring is also provided with a pair of lugs 23—24 with a hole therethrough to receive the burner supporting rod 25, a bolt 26 enabling those two lugs to be tightened on the rod 25.

The end of the rod is threaded for a short distance as indicated at 27 and a sleeve 28 is threaded thereon, said sleeve being connected with another rod 29 which has a flat head 30 at its end to receive and hold the burner tip clamp. The rod 29 has a pin 31 (see Figure 3) slidable in a slot in a tube 25, the object being to hold the two members in alignment and to allow them to be readily extended or retracted by the rotation of the sleeve 28, a groove being formed in the rod 29 at 29' to receive a pin 28' in the threaded sleeve.

The supporting bar 12 has a small graduated plate 12' thereon which acts as an indicator for a needle 33 on the back of the worm wheel supporting plate 17, the object being to determine the angle at which the worm wheel is to be set.

The ring in the worm wheel is also provided with two lugs 35—36 which act as bearings for a small hand crank 37 which carries the worm 38.

The burner tip 1 is of the ordinary oxy-acetylene type, and is secured to the head 30 by any suitable means and is set so that it will cut at the desired angle with respect to the plane of movement of the ring flange surrounding the worm wheel.

The operation of the apparatus is as follows: Assuming the burner support to be set up within a pipe the angle of a cut is determined and the plane of the worm wheel is actually adjusted to produce the desired cut therefrom, the burner is lighted and the workman turns the sleeve 28 until the burner tip strikes the plate in just the way he desires whereupon he turns on the oxygen jet as usual and then begins to rotate the crank 37, whereupon the burner will be carried around, and will cut the pipe off in a true plane with the desired bevel.

It will be understood by those skilled in the art also that the bevels used on large pipes are ordinarily not very considerable because of the great friction caused by sharp turns. The result of this is that the major and minor axes of the ellipse produced by the cuts are not greatly different so that it is possible for the flange itself to accommodate the change in length of axes without changing the adjustment of the burner when it is once set. It will also be seen that it is necessary to have the burner tip in the proper radial plane with respect to the center about which the worm wheel turns and also in the plane of the worm wheel in order for it to cut the pipe in the desired plane and this is accomplished by proper setting of the several adjustable arms.

Having thus described my invention, what I desire to secure by Letters Patent of the United States is as follows, but modifications may be made in carrying out the invention as shown in the drawings and in the above particularly described form thereof, within the purview of the annexed claims:

1. Pipe cutting mechanism comprising a holder, a spider for supporting the holder within a pipe, means to support the burner on said holder with its tip in proximity to the pipe, means to rotate the holder and means to change the angle of said holder whereby said burner may be caused to travel in different planes.

2. Pipe cutting mechanism comprising a spider adapted to fit within a pipe, means to rigidly hold said spider in a given position in said pipe, a burner holder rotatably mounted on said spider, means to rotate the burner holder in a plane at a right angle to the axis of the pipe, and means to change the angle of travel of said burner holder whereby the pipe may be cut off in any desired plane by the burner flame.

3. A burner holder comprising a spider having adjustable spikes for holding said spider in a fixed position inside of the pipe, an adjustable standard supported thereby, a worm gear thereon, means to adjust said worm gear to stand in any desired plane with respect to the axis of the pipe, a burner support movable axially with respect to the said worm gear, and means for moving said burner support whereby the burner may be turned around inside the pipe in any desired plane to cut the pipe on a bevel or at right angles to its axis as may be desired.

4. A pipe cutting mechanism comprising spaced radial arms, a threaded bolt in the end of said arms, a spike point on said bolts adapted to engage the inside of a pipe, a hub for said arms, a tube slidable in said hub longitudinally of the length of pipe to be cut, means to clamp said tube, a flat head on said tube, a plate pivoted on said head and adapted to swing longitudinally of said pipe and be set at different angles, an adjustable burner holder mounted on said plate, and means to turn said burner holder around said plate in a path of motion predetermined by the angle of said plate.

5. A pipe cutting burner holder comprising means to mount a burner in the end of a pipe to be cut off, means to revolve said burner with its flame against the inside surface of the pipe, and means to cause the burner to travel in a path to cut the pipe off at an acute angle to the axis of the pipe, and means to change the angle of the path of travel of said burner.

6. A pipe cutting burner of the class described comprising means to mount a burner inside of a pipe to be cut off, interacting means to revolve said burner with its flame against said surface of the pipe, and means to change the angle with respect to the pipe axis at which the burner is adapted to revolve.

7. A pipe cutting burner of the type described comprising means to mount a burner inside of a pipe to be cut off, interacting means to revolve said burner with its flame against said surface of the pipe, means to change the angle with respect to the pipe axis at which the burner is adapted to revolve, and means for adjusting the distance of said burner from the surface to be cut.

In testimony whereof I have hereunto set my hand this 7th day of May, A. D. 1926.

HUGH F. BROWN.